(12) United States Patent
Golias

(10) Patent No.: US 7,568,720 B2
(45) Date of Patent: Aug. 4, 2009

(54) WHEELED VEHICLE

(76) Inventor: Matthew E Golias, 17 Nimmo Street, Middle Park, Victoria 3206 (AU)

(*) Notice: Subject to any disclaimer, the term of this patent is extended or adjusted under 35 U.S.C. 154(b) by 541 days.

(21) Appl. No.: 10/554,796

(22) PCT Filed: Aug. 13, 2003

(86) PCT No.: PCT/AU03/01024

§ 371 (c)(1), (2), (4) Date: Oct. 28, 2005

(87) PCT Pub. No.: WO2004/096629

PCT Pub. Date: Nov. 11, 2004

(65) Prior Publication Data

US 2007/0052189 A1 Mar. 8, 2007

(30) Foreign Application Priority Data

Apr. 30, 2003 (AU) .............................. 2003902057

(51) Int. Cl.
*B62B 3/02* (2006.01)
(52) U.S. Cl. ..................... 280/639; 280/287; 280/87.05
(58) Field of Classification Search ................... 280/29, 280/200, 287, 638, 639, 87.01, 87.05, 47.34; D21/424, 435
See application file for complete search history.

(56) References Cited

U.S. PATENT DOCUMENTS

| | | | |
|---|---|---|---|
| 1,658,068 A * | 2/1928 | White ................... | 280/87.041 |
| 3,905,618 A | 9/1975 | Miranda et al. | |
| 5,785,338 A | 7/1998 | Chang | |
| 6,152,473 A * | 11/2000 | Shih ............................ | 280/278 |
| 6,173,976 B1 | 1/2001 | Lee | |
| 6,179,307 B1 | 1/2001 | Mao | |
| 6,364,335 B1 * | 4/2002 | Mombelli .................. | 280/287 |
| 6,517,093 B2 | 2/2003 | Feng | |
| 6,609,723 B2 * | 8/2003 | Chuang ...................... | 280/287 |
| 6,854,551 B2 * | 2/2005 | Wisecarver ................. | 180/208 |
| 6,986,522 B2 * | 1/2006 | Sinclair et al. ............. | 280/287 |
| 7,100,929 B2 * | 9/2006 | Shapiro et al. ............. | 280/282 |
| 2003/0080535 A1 * | 5/2003 | Kurohori et al. ........... | 280/638 |
| 2005/0151345 A1 * | 7/2005 | Chen ......................... | 280/287 |

FOREIGN PATENT DOCUMENTS

| | | |
|---|---|---|
| JP | 1976-149276 | 12/1976 |
| JP | 1984-193792 | 12/1984 |
| JP | 3036926 | 2/1997 |
| JP | 2003-146282 | 5/2003 |
| JP | 2003-175875 | 6/2003 |
| WO | WO 02/46032 A1 | 6/2002 |

* cited by examiner

*Primary Examiner*—Christopher P Ellis
*Assistant Examiner*—John D Walters
(74) *Attorney, Agent, or Firm*—Workman Nydegger

(57) ABSTRACT

A wheeled vehicle such as a tricycle able to be folded from an in use position to a carryable storage position by connection of steering rod (31) and front wheel strut (32) to the seat (25) in a manner that allows rotational, pivotal and sliding movement of front steering rod (31). The second storage position has the steering rod (31) and front wheel strut (32) with attached wheel (36) and back rear struts (25, 27) with attached wheels folded underneath the seat in a readily carryable format and minimal volume.

30 Claims, 22 Drawing Sheets

WHEELED VEHICLE

FIELD OF THE INVENTION

This invention relates to a wheeled vehicle able to support a person and parts therefore and attachment of parts. It is particularly related to a vehicle for use by children. It is more particularly related to a tricycle for use by a small child but is not limited to such.

BACKGROUND ART

A wheeled vehicle such as a tricycle or bicycle or a scooter has a very large awkward shape and is therefore not very transportable from one location to another. Children's toys such as wheeled vehicles need to be transported from home to the local playground or other people's houses.

It is necessary to deliver such wheeled vehicles in quantity to retail establishments for sale as a new product. This is achieved by delivering such goods in a partially assembled flat package. However this system also requires an expert at the retail establishment to assemble and test the vehicle. Otherwise it might be assembled at home but in this case the construction needs to include fastening means, which are not able to be unfastened. Only in this way can the wheeled vehicle be guaranteed as safely constructed and unlikely to accidentally disassemble.

Therefore, there is a need for a construction of wheeled vehicle, which allows ready transportability after initial use without disassembly.

BRIEF DESCRIPTION OF THE INVENTION

In accordance with the invention there is provided a wheeled vehicle such as a tricycle including a body frame having a seat on an upper part; at least one front wheel strut extending from a front portion of the body frame and having one or more wheels rotatably attached to the wheel struts; a steering mechanism connected to the front wheel strut and able to rotate said strut and said attached one or more wheels in a direction substantially normal to the plane of rotation of the wheels; the front wheel strut and the steering mechanism having at least one connection means to the body frame to allow movement from a first in use position where the struts and steering mechanism are substantially extending at an angle to the body frame to a second storage position where the struts and steering mechanism are substantially extending alongside the body frame.

The wheeled vehicle can include at least one back wheel strut with one or more wheels attached and the front wheel strut and the back wheel strut form a splayed arrangement in the first in use position to allow the weight of the rider of the wheeled vehicle to be supported on the seat. The front wheel strut can extend at an angle between 20° and 30°.

The connection means can include pivotal mounting of the front wheel strut and the steering mechanism to the body frame. The connection means includes a collar capturing a central elongated steering rod having a handle at a top end and forming the front wheel strut at the bottom end with one or more attached ground engaging wheels with the collar enabling rotation of the wheel by turning of the handle to allow steering of the wheeled vehicle when in the first in use position, and the collar pivotally connected to the body frame to allow pivotal rotation of the front wheel strut alongside the seat in the second storage position.

The central elongated steering rod is captured in the collar to allow longitudinal sliding at least partially through the collar such that in the second storage position the end of the central steering rod having the handle can be slid through the collar to decrease the protrusion of the handle beyond the seat.

The central steering rod can be maintained in an in use position by a locking means having an engagement body for engaging between the body frame and the collar or central steering rod to prevent pivotal rotation of the front wheel strut alongside the seat in the second storage position while allowing axial rotation of the steering rod for steering of the wheeled vehicle. The engagement body of the engagement means is in one form a sliding latch mechanism sliding within the body frame and engaging protrusions on the collar to selectively maintain the central steering rod in an in use position or to allow sliding of the latch mechanism to disengage the protrusions and allow pivotal rotation of the central steering rod including the front wheel strut to a storage position alongside the body frame. The wheeled vehicle includes a spring means engaging the collar and the central steering rod to maintain a predetermined upper portion of the central steering rod above the collar.

In another form the central steering rod can have a first engagement means such as a protruding collar for engaging a second engagement means such as a mating protruding collar above the central steering rod engagement means in opposition to the tendency of the spring means which limits the longitudinal movement of the central steering rod when in an in use position.

The invention also provides a tricycle including an elongated body frame forming a seat; two wheel struts connected to and extending from an underneath rear portion of the body frame and each having one or more wheels rotatably attached to the wheel struts; a elongated post mounted at a front portion of the body frame and a first section extending below the body frame forming a front wheel strut and having one or more wheels rotatably attached to the wheel struts and a second section extending on the upper side of the body frame and forming a steering mechanism connected to the front wheel struts and able to rotate said strut and said attached wheels in a direction substantially normal to the plane of rotation of the wheels; the elongated post and back wheel struts each having a connection means to the body frame to allow movement from a first in use position where the struts and steering mechanism are substantially extending away from the body frame to a second storage position where the struts and steering mechanism are substantially extending adjacent the body frame.

Therefore the invention provides a wheeled vehicle such as a tricycle able to be folded from an in use position to a carryable storage position by connection of steering rod and front wheel strut to the body frame or seat in a manner that in one form allows rotational, pivotal and sliding movement of front steering rod. The second storage position in this form has the steering rod and front wheel strut with attached wheel and back rear struts with attached wheels folded. underneath the seat in a readily carryable format and minimal volume.

BRIEF DESCRIPTION OF THE DRAWINGS

In order that the invention can be more readily understood an embodiment will be described by way of illustration only with reference to the drawings wherein.

DESCRIPTION OF THE PREFERRED EMBODIMENT

Figure 1:
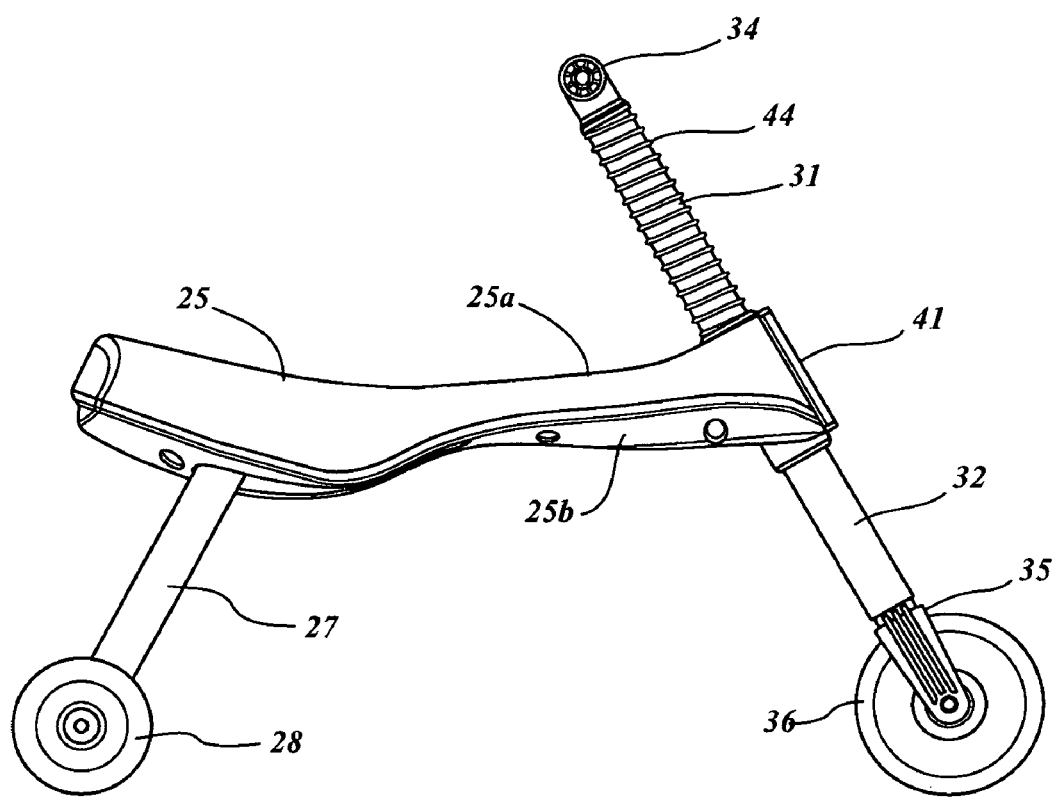
FIG. 1 is a side elevation of a wheeled vehicle in the form of a tricycle in an in use position in accordance with the invention.
Figure 2:
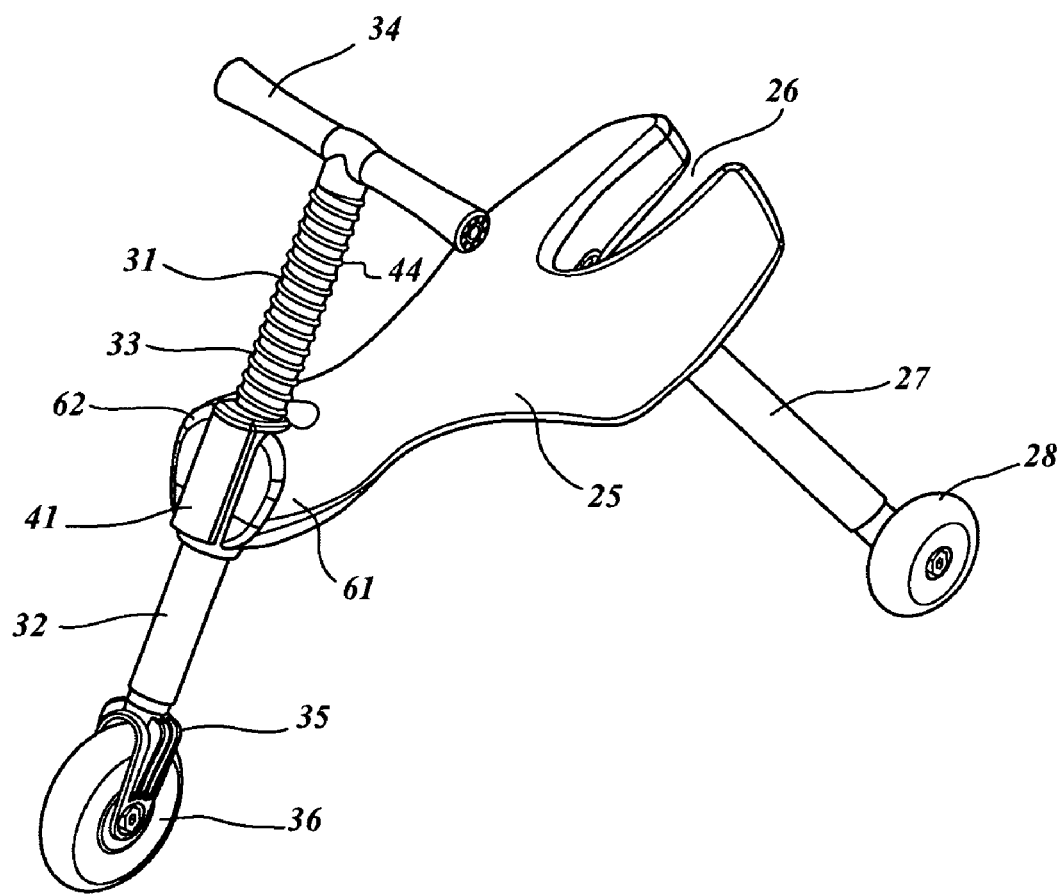
FIG. 2 is a front above perspective view of the tricycle of FIG. 1.
Figure 3:
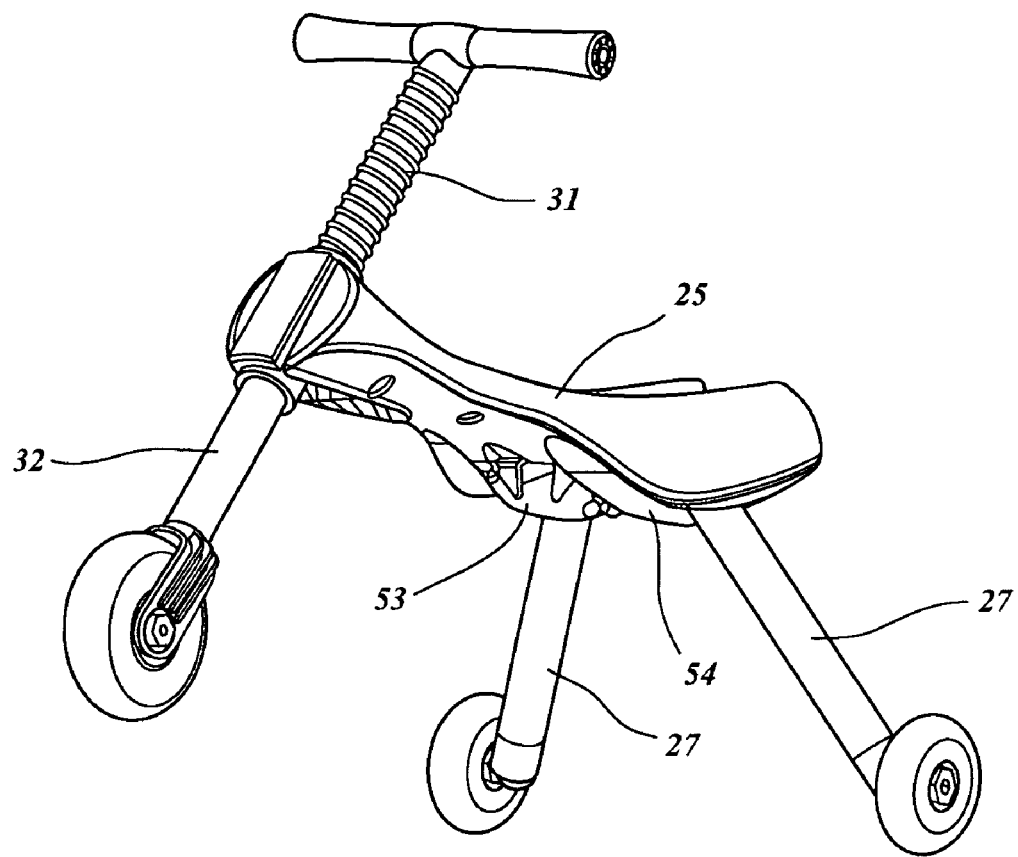
FIG. 3 is a front below perspective view of the tricycle of FIG. 1.
Figure 4:
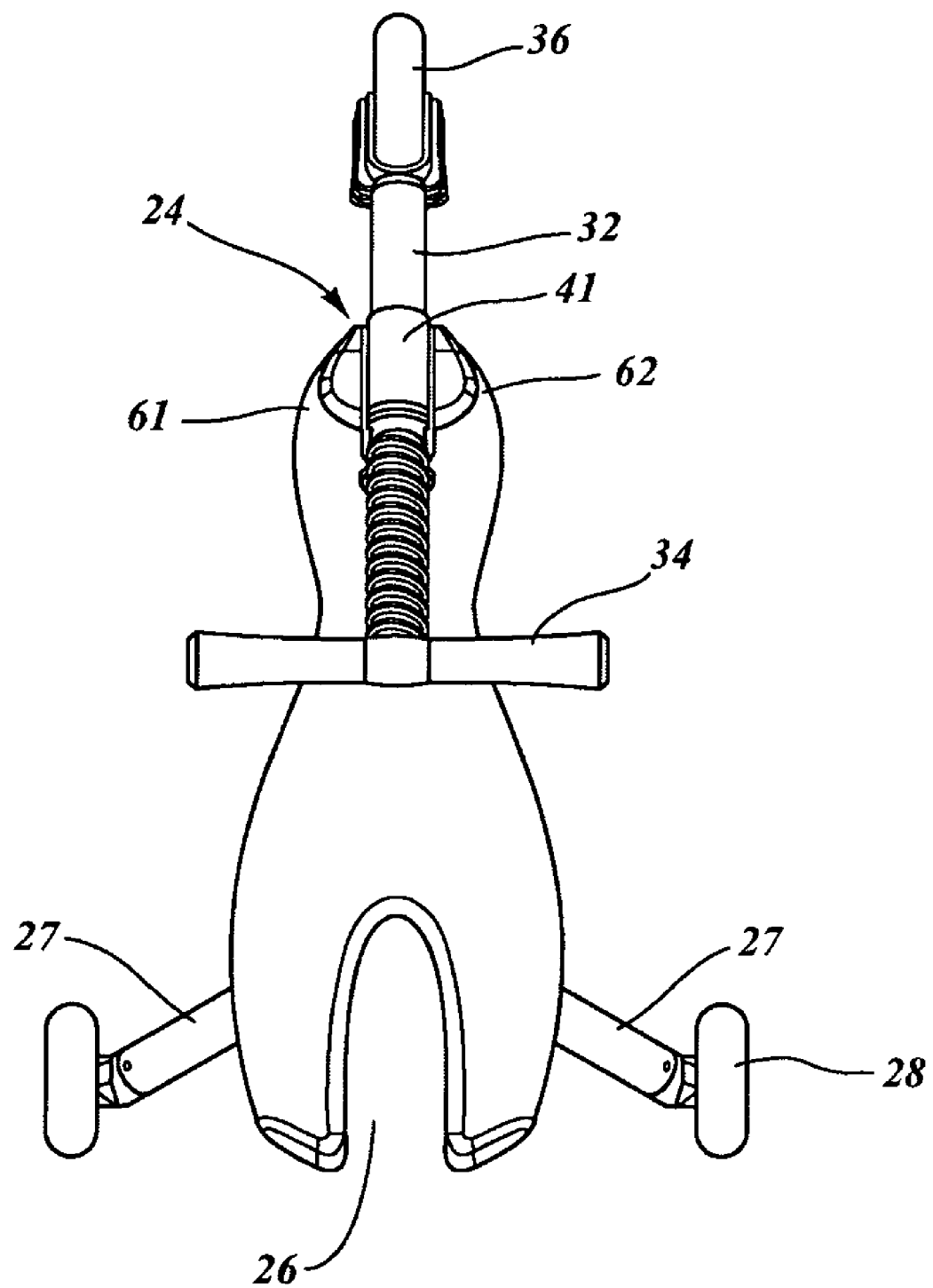
FIG. 4 is an overhead plan view of the tricycle of FIG. 1.
Figure 5:
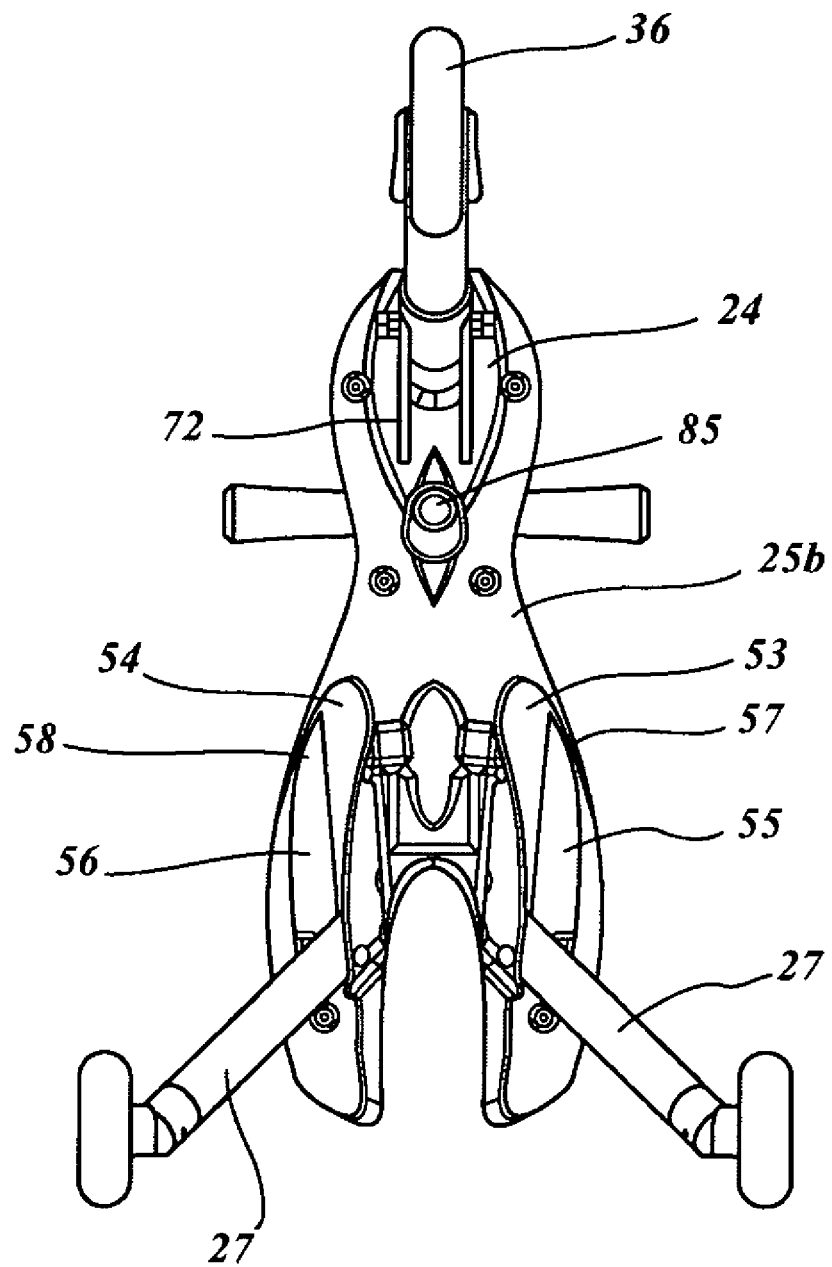
FIG. 5 is an underneath plan view of the tricycle of FIG. 1.
Figure 6:
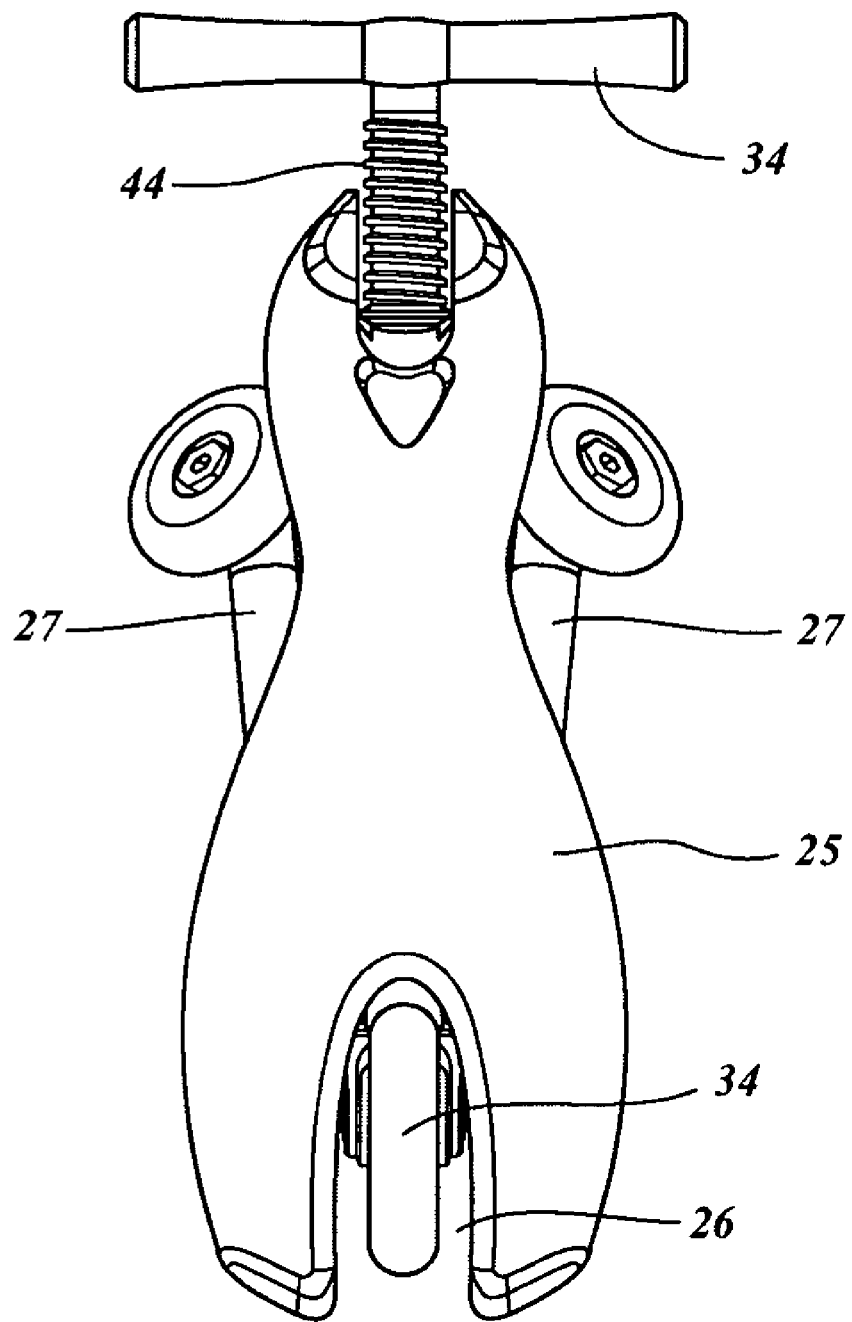
FIG. 6 is an overhead plan view of the tricycle of FIG. 1 in a second storage position.
Figure 7:
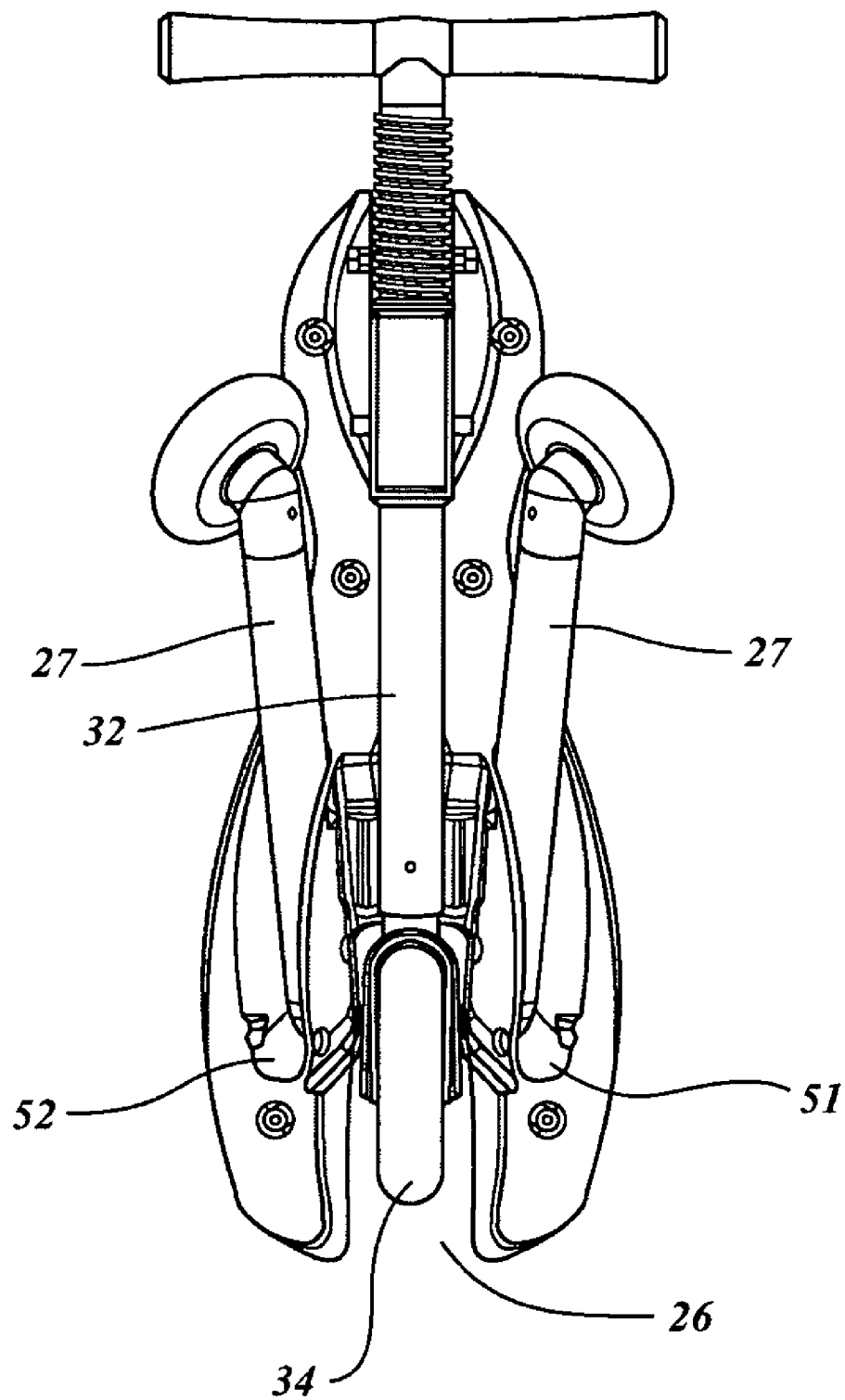
FIG. 7 is an underneath plan view of the tricycle of FIG. 6 in a second storage position.
Figure 8:
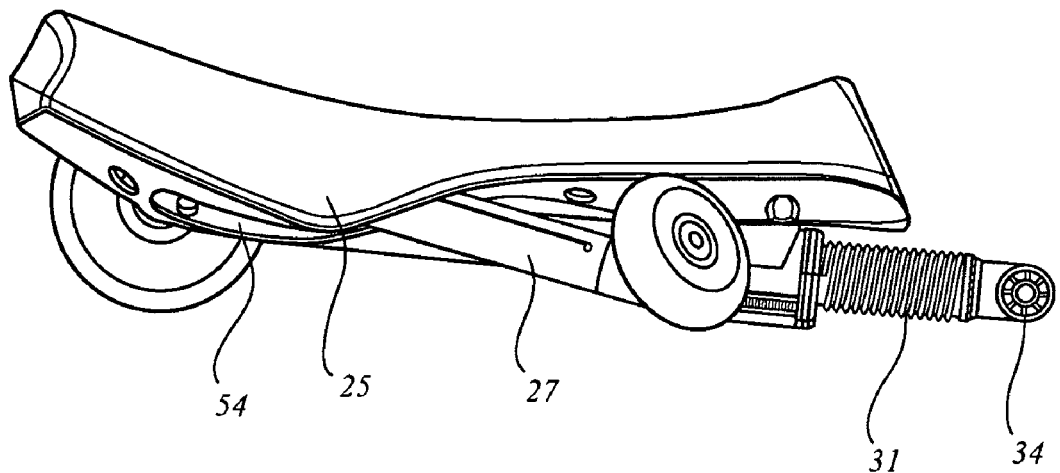
FIG. 8 is a side elevation of the tricycle of FIG. 6 in a second storage position.
Figure 9:
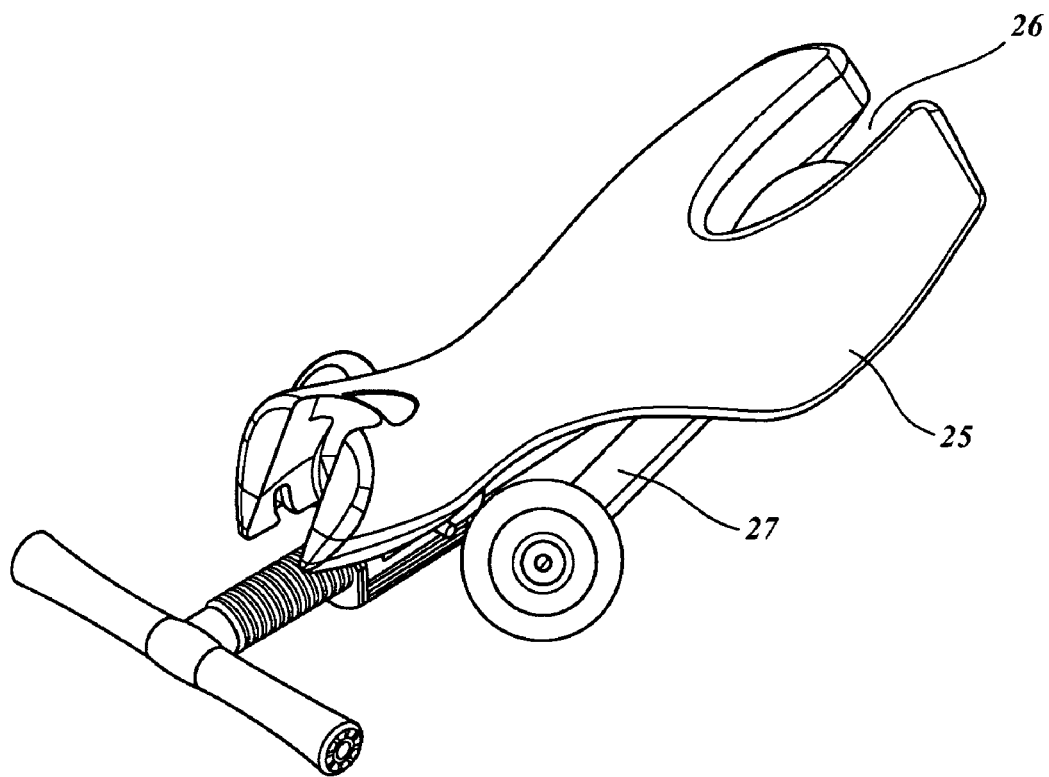
FIG. 9 is a front above perspective view of the tricycle of FIG. 6.
Figure 10:
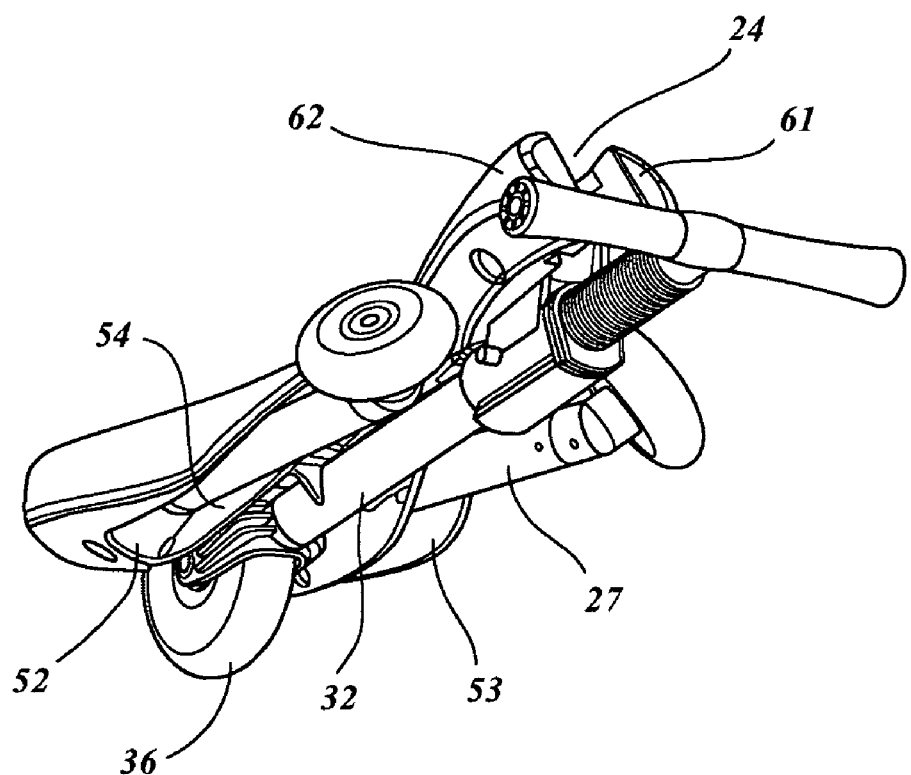
FIG. 10 is a front below perspective view of the tricycle of FIG. 6.
Figure 11:
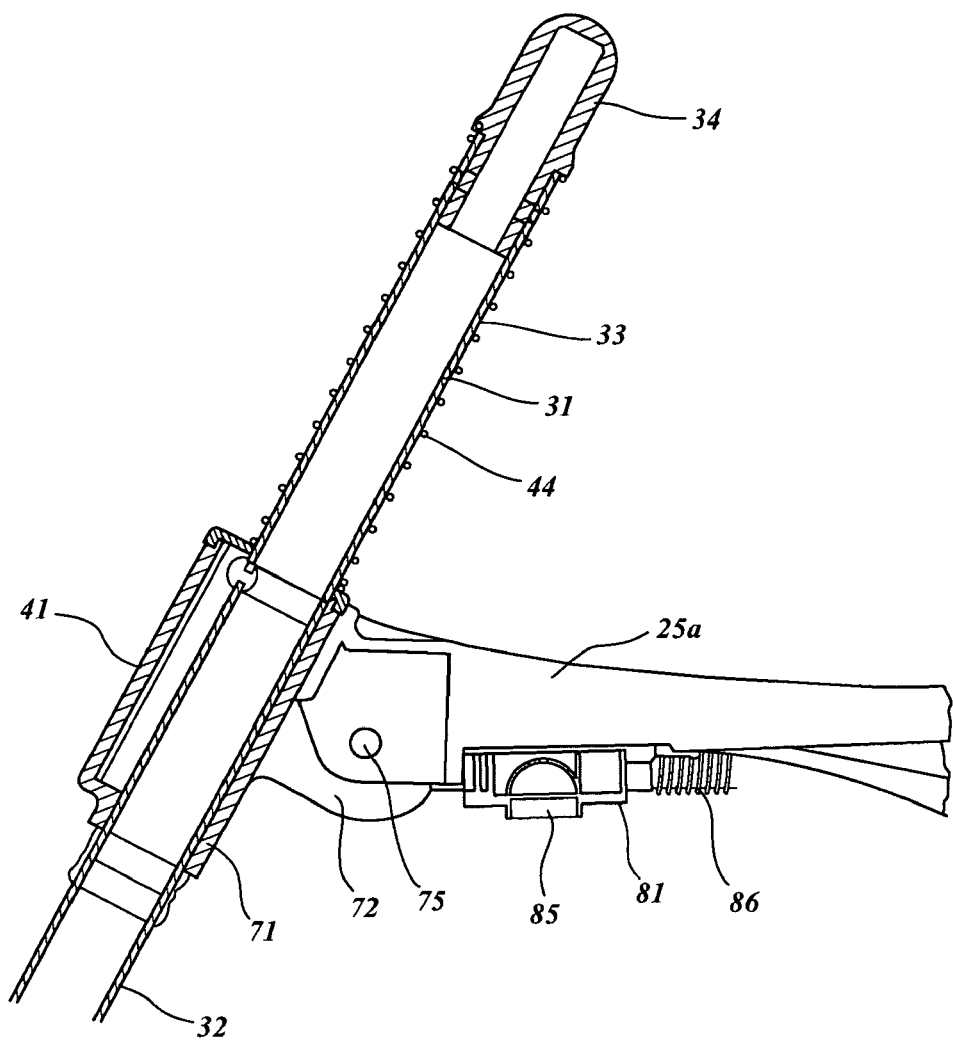
FIG. 11 is a partial side cross sectional view of a wheeled vehicle in the form of the tricycle of FIG. 1 in a first embodiment with an external spring arrangement in an in use position.
Figure 12:
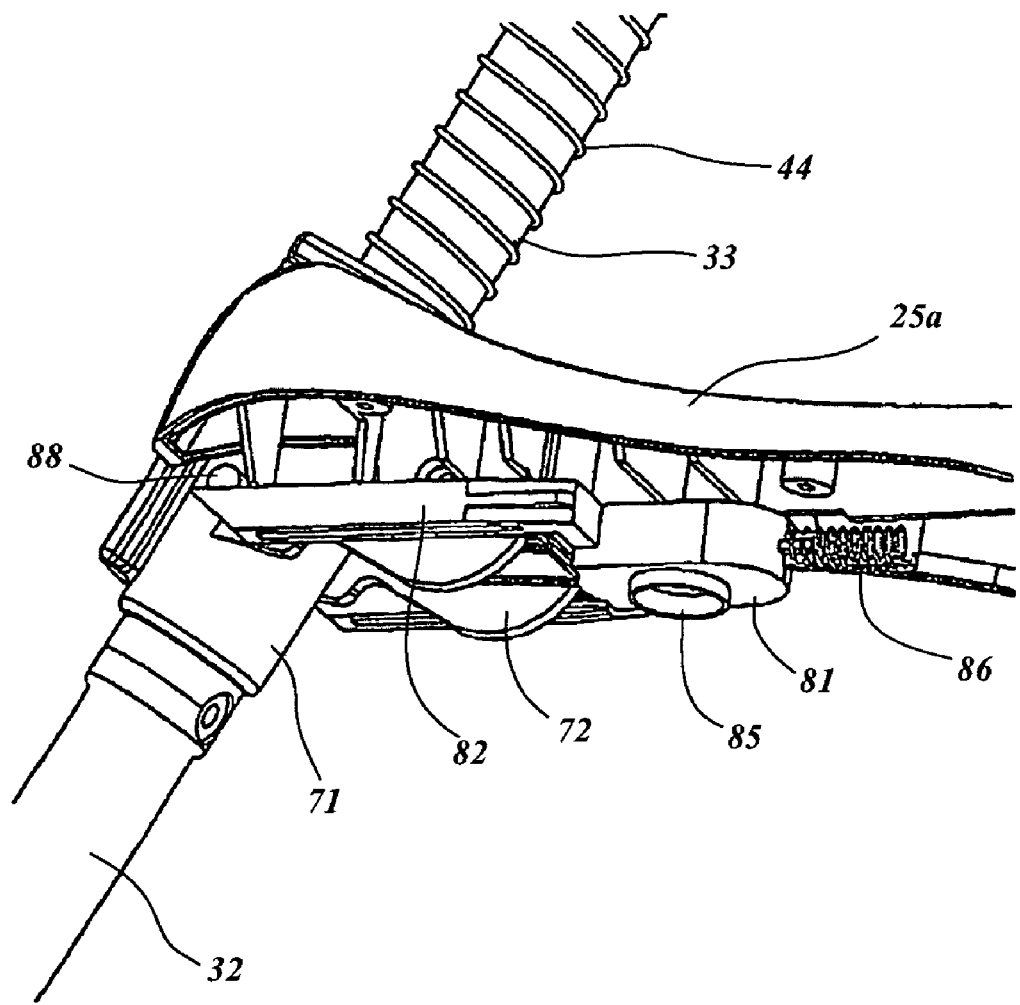
FIG. 12 is a side below perspective view of the tricycle of FIG. 11 with a lower part of the seat moulding removed.
Figure 13:
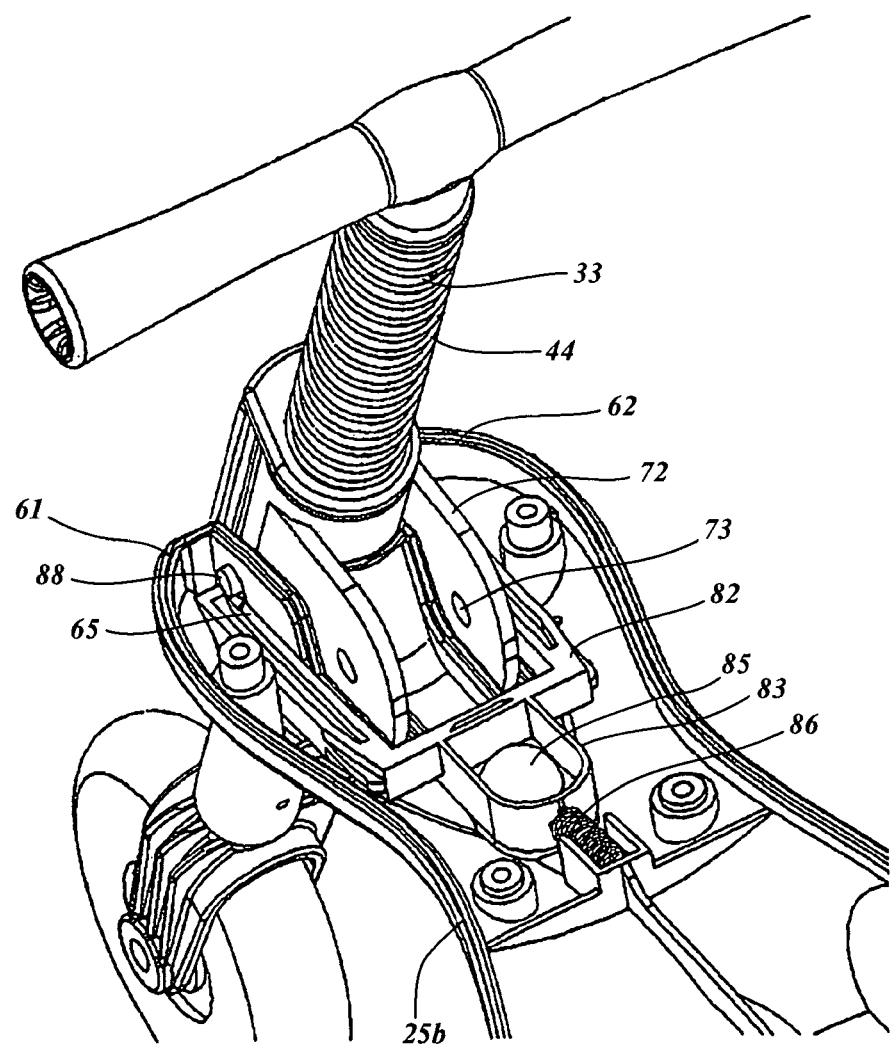
FIG. 13 is an overhead perspective view of the tricycle of FIG. 11 with an upper part of the seat moulding removed.
Figure 14:
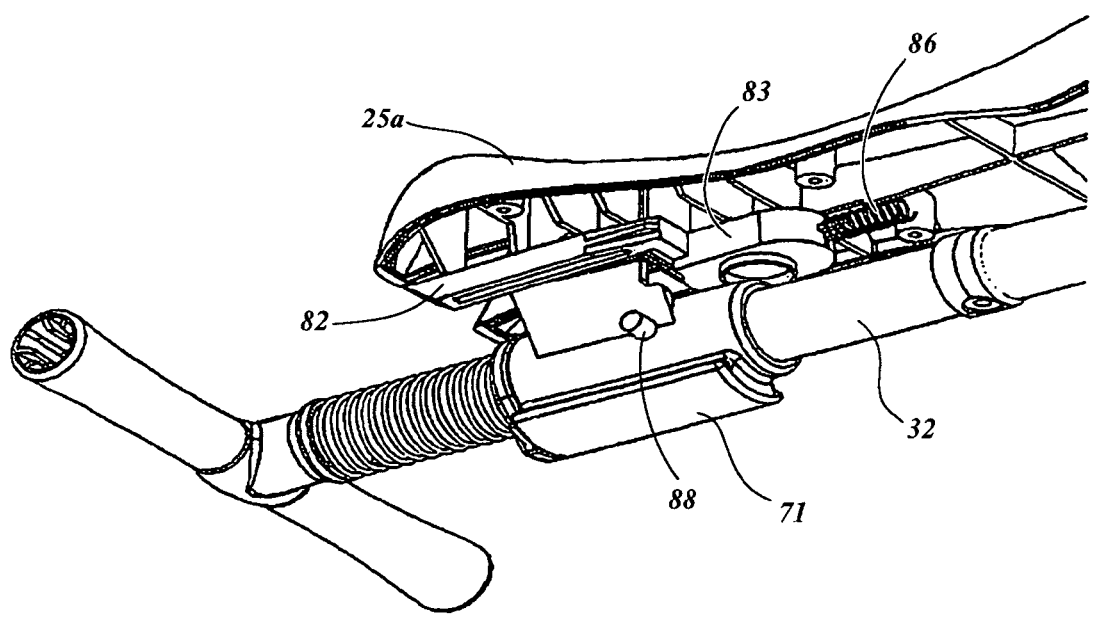
FIG. 14 is a side below perspective view of the tricycle of FIG. 11 in a partially second storage position with a lower part of the seat moulding removed.
Figure 15:
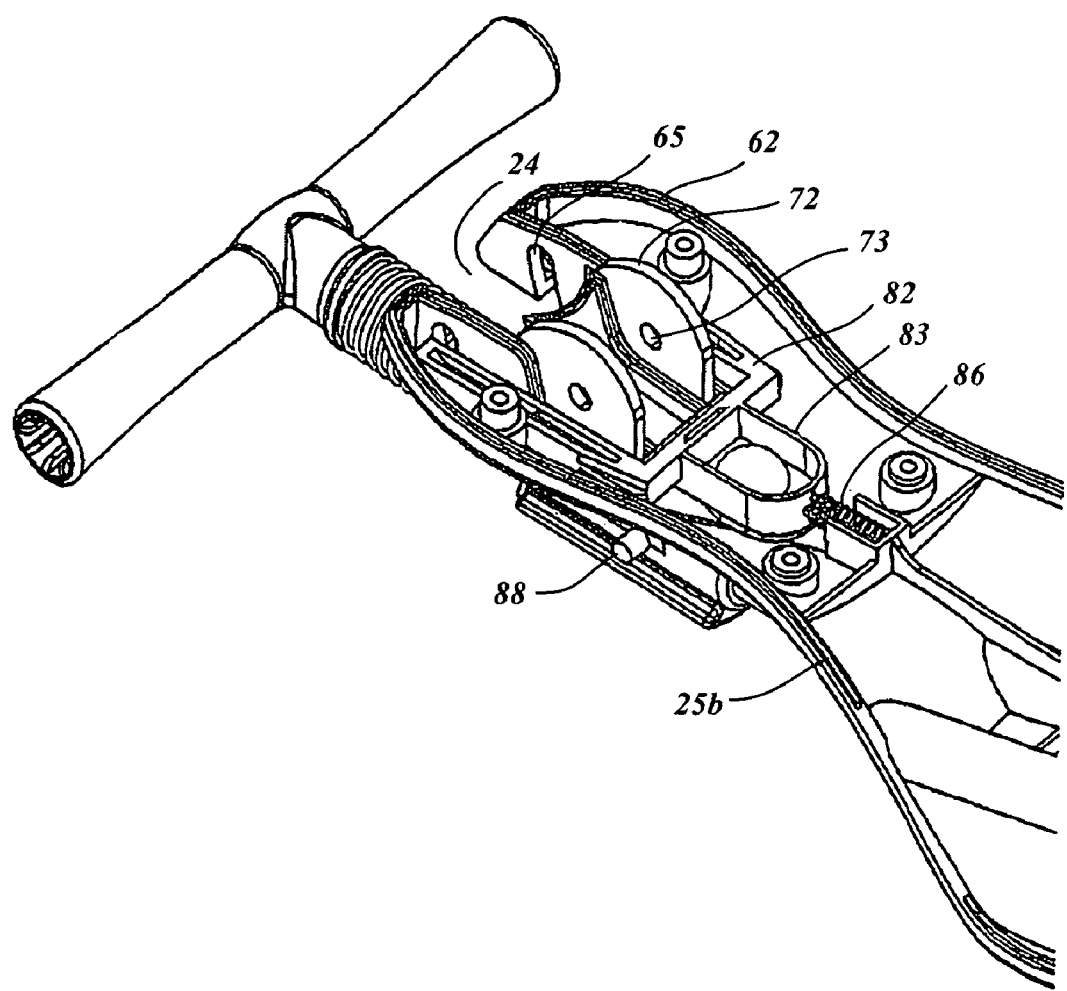
FIG. 15 is an overhead perspective view of the tricycle of FIG. 11 in the second storage position with an upper part of the seat moulding removed.
Figure 16:
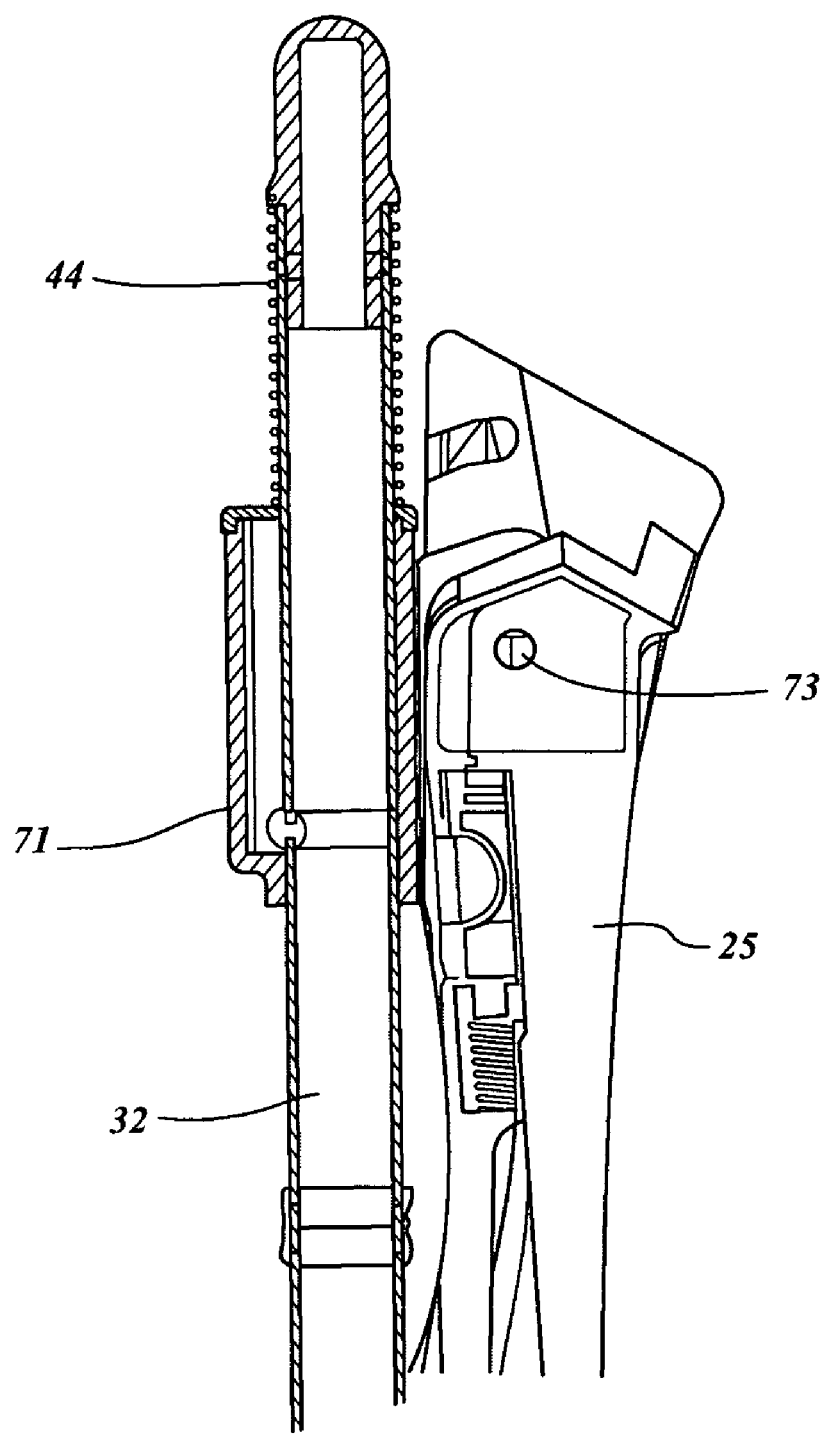
FIG. 16 is a partial side cross sectional view of a wheeled vehicle in the form of the tricycle of FIG. 11 in the second storage position.
Figure 17:
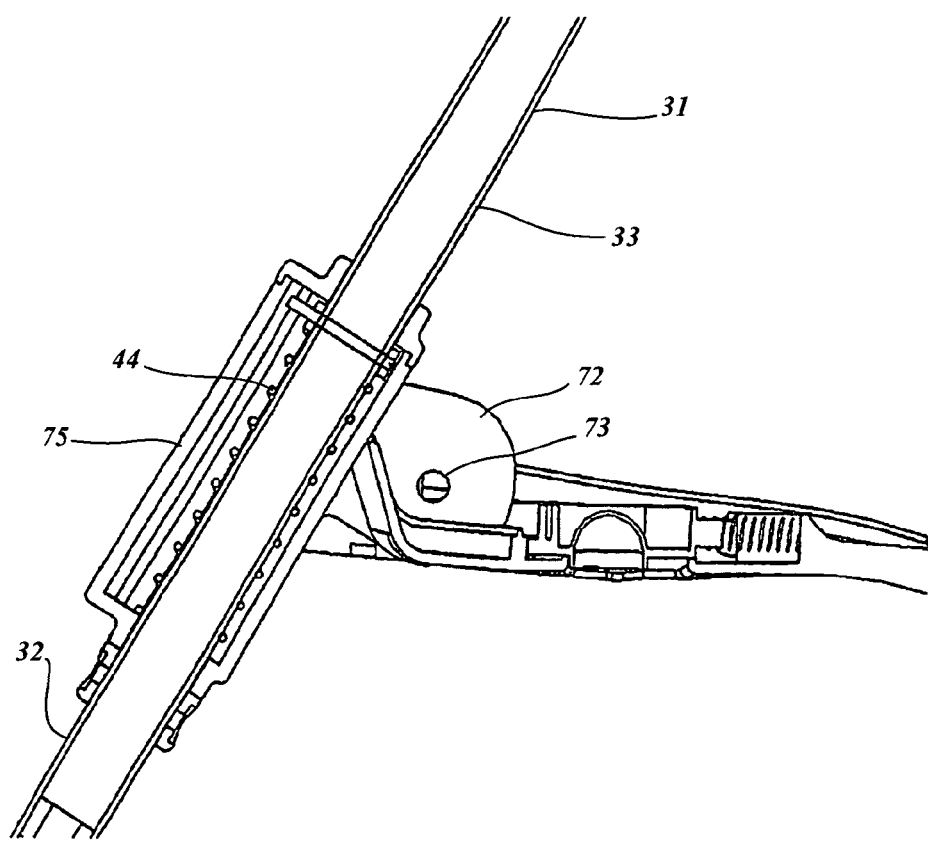
FIG. 17 is a partial side cross sectional view of a wheeled vehicle in the form of the tricycle in a second embodiment with an internal spring arrangement and in an in use position.
Figure 18:
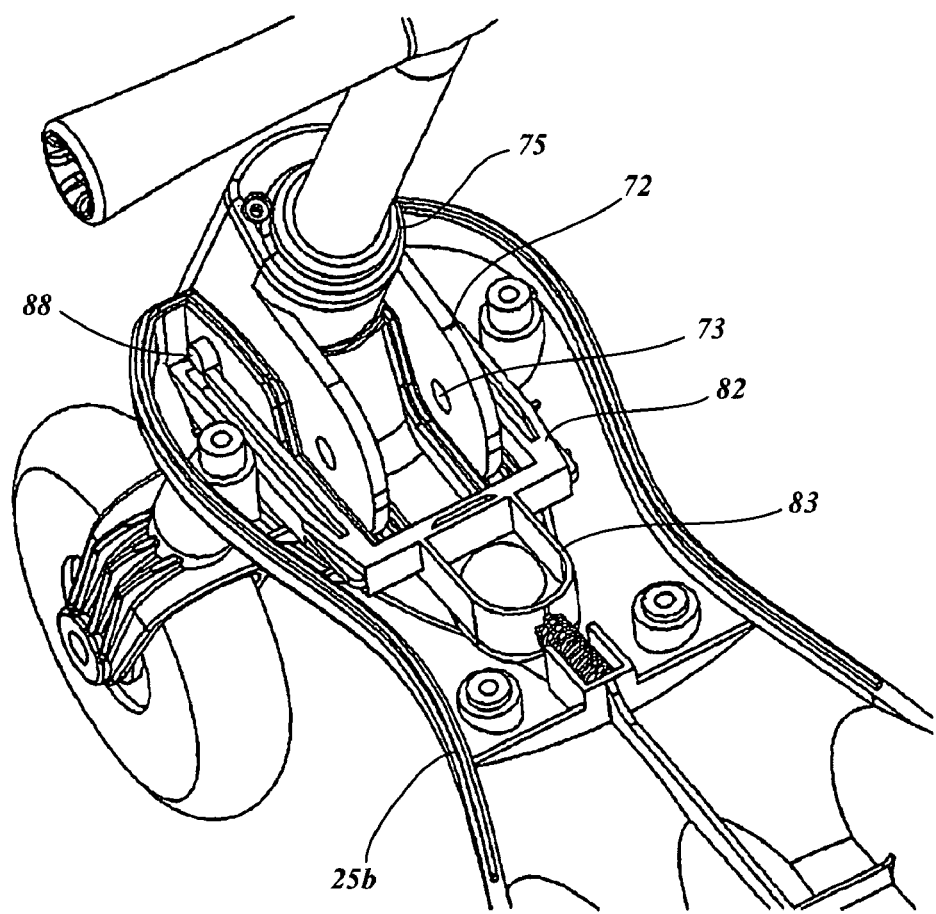
FIG. 18 is an overhead perspective view of the tricycle of FIG. 17 with an upper part of the seat moulding removed.
Figure 19:
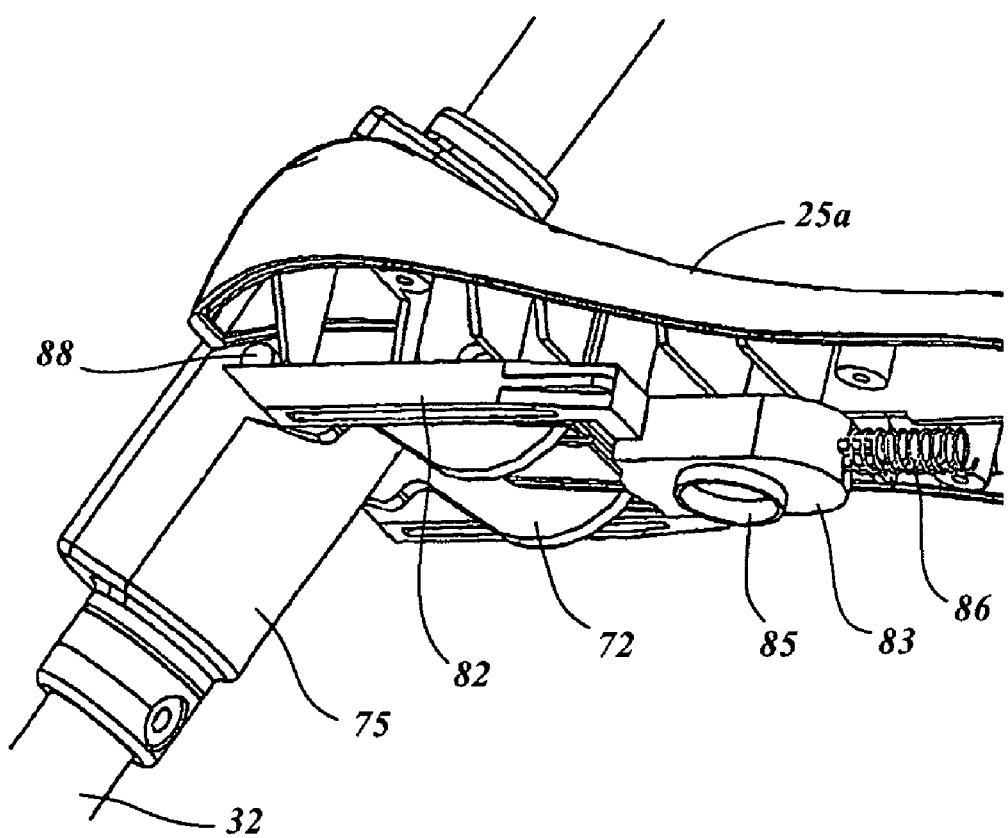
FIG. 19 is a side below perspective view of the tricycle of FIG. 17 with a lower part of the seat moulding removed.
Figure 20:
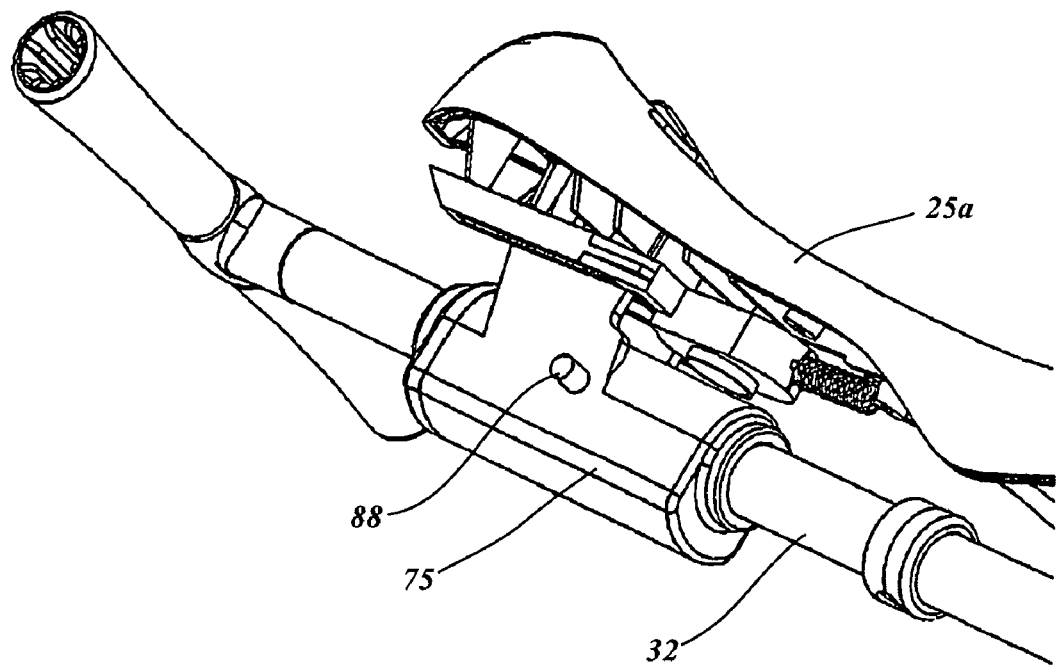
FIG. 20 is a side below perspective view of the tricycle of FIG. 17 in a partially second storage position with a lower part of the seat moulding removed.
Figure 21:
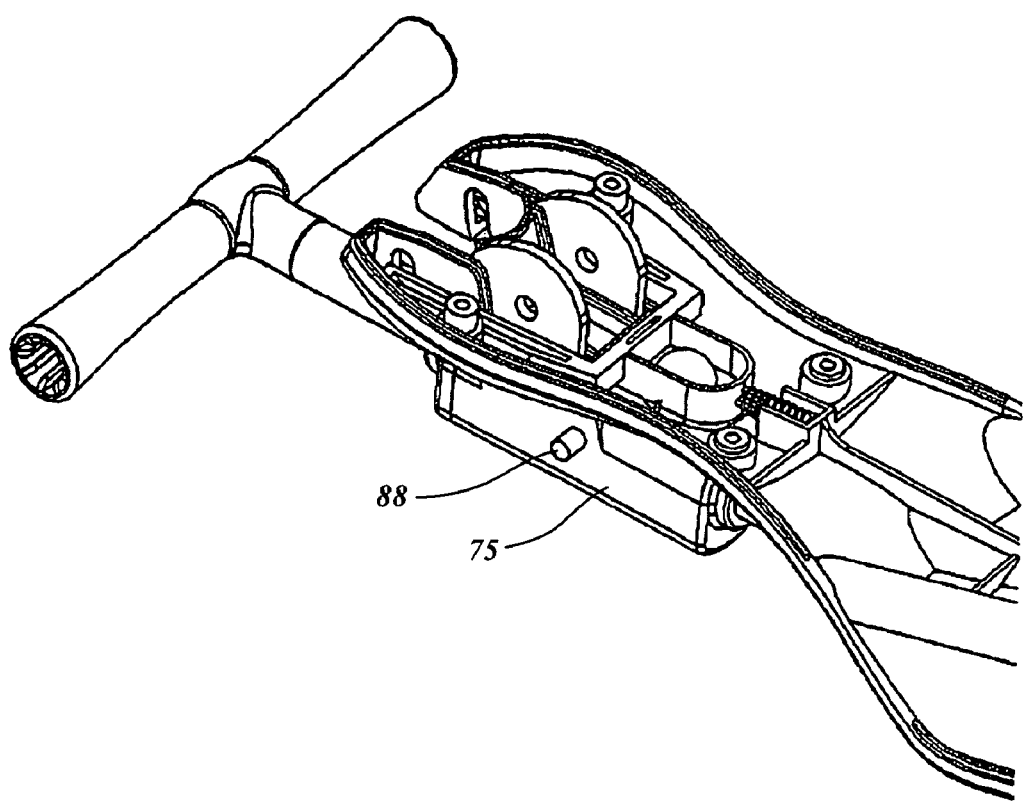
FIG. 21 is an overhead perspective view of the tricycle of FIG. 17 in the second storage position with an upper part of the seat moulding removed.
Figure 22:
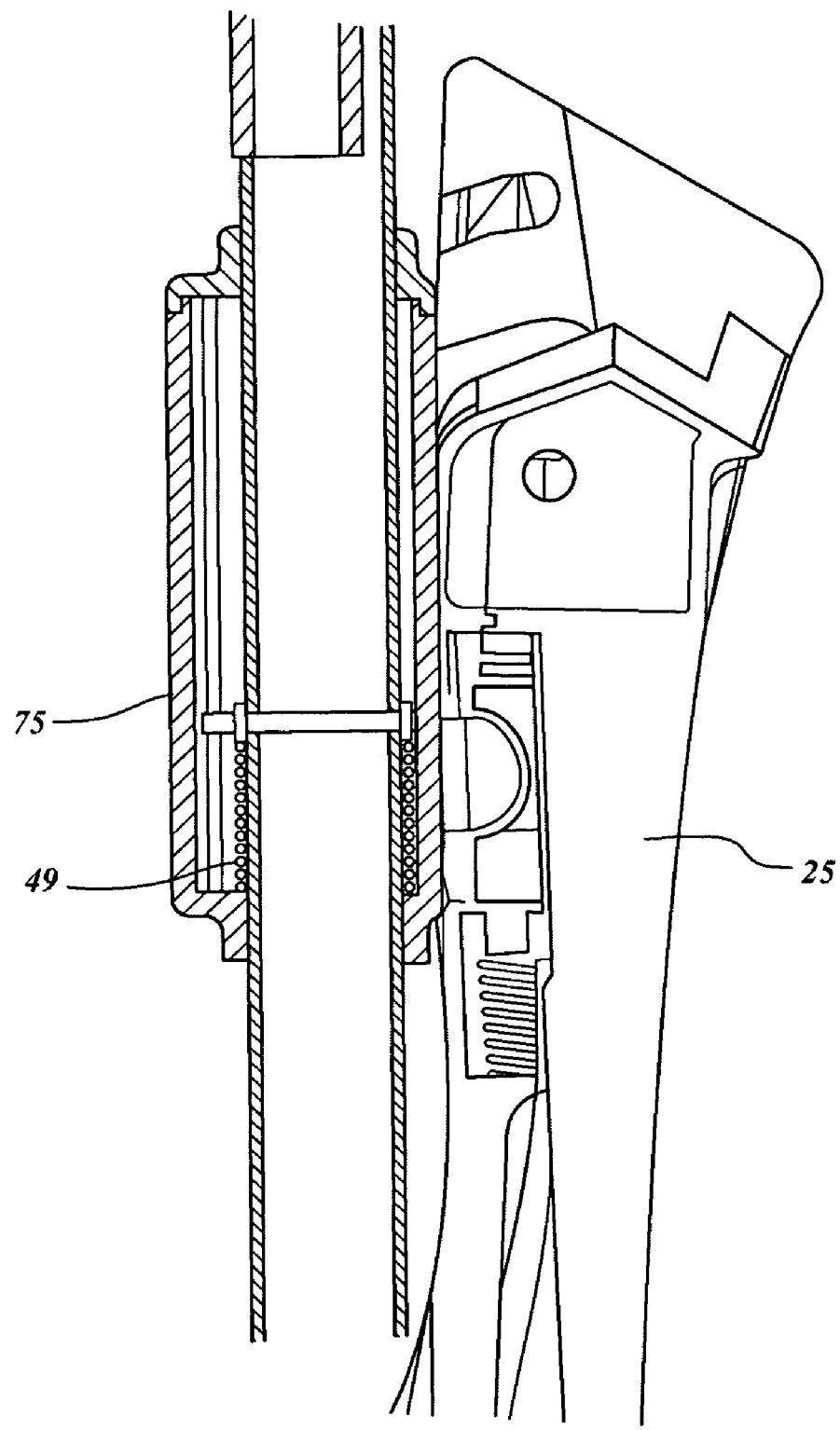
FIG. 22 is a partial side cross sectional view of a wheeled vehicle in the form of the tricycle of FIG. 17 in the second storage position.

Referring to the drawings there is shown a tricycle 11 having an elongated body frame 21 forming a seat 25 on its upper side to support a rider of the tricycle 11. The seat from above is substantially elongated FIG. 8 shape with smaller front portion to back sitting portion and the narrow sides between front and back allowing the legs of the rider to sit astride the seat. The seat 25 is formed by joining two moulded parts 25a and 25b to provide strength and allow moulding of underneath cavities. The seat 25 has central linear cutouts 24, 26 in the FIG. 8 shape at the front and back.

Two tubular linear wheel struts 25, 27 are each connected to and extend from an underneath rear portion of the body frame 21 near the sides of the rear cut-out 26 near the rear of the seat 25. At the distal end of each wheel strut 25, 27 to the connection to the body frame 21 is mounted a wheel 26, 28. The wheel struts are splayed rearwardly and diverge relative to each other but have wheels 28 mounted to the outer side with the wheels being substantially parallel to each other and able to rotate and support the rear of the body frame 21.

At the narrower front end of the seat 25 is mounted an elongated continuous tubular post 31 having a lower section 32 extending below the body frame 21 and connected to an inverted U-shaped fork 35 forming a front wheel mount 32 holding a wheel 36 therein. An upper section 33 of the tubular post 31 extends above the body frame and is connected at its top end to a cross member forming a T-shaped steering mechanism 34. The wheel 36 is rotatably attached so that in use the rear wheels 26, 28 and the front wheel 36 are able to rotate in substantially parallel planes.

The upper section 33 with the cross member 34 extending on the upper side of the body frame and forming a steering mechanism is connected to the front wheel strut formed by the lower section 32 and is able to rotate said strut and said attached wheel 36 in a direction substantially normal to the plane of rotation of the wheel 36. The plane of rotation of the front wheel 36 can be altered by rotation of the T-shaped steering mechanism.

To allow this rotation the elongated continuous tubular post 31 needs to be held by a special connection structure 41 at the front end of the seat 25. To fulfill all of the benefits of the invention the connection structure not only needs to allow rotation of the elongated continuous tubular post 31 around the posts elongated axis but also rotation relative to the seat 25 such that it is able to move from an in use position to a storage position under the seat with the front wheel 36 in the back cut-out 26 in the in use position the elongated continuous tubular post 31 is splayed outward with the front wheel 36 and rear wheels 26, 28 are located at the edges of the greatest footprint of the wheeled vehicle. In the second storage position the elongated continuous tubular post 31 is able to rotate relative to the seat to extend substantially adjacently underneath the seat 25.

To more fully allow this rotation and minimise the footprint of the of the tricycle in the storage position a portion of the upper section 33 of the elongated continuous tubular post 31 is able to slide through the connection means 41 to decrease the extension of the T-shaped cross member 34 and upper section 33 in front of the seat 25.

Also the rear wheeled struts 25, 27 each have a pivotal connection means 51 52 to the underneath of the seat 25 to allow pivotal movement from a first in use position where the struts are substantially extending away from the body frame to a second storage position where the struts are substantially extending adjacent and underneath the seat 25. The underneath of the seat 25 includes two elongated folded sheet shaped guards 53 54 protruding downwards along the part of the length of the seat 25 from adjacent the pivotal connection means 51 52 at the rear of the seat and having contiguous tubular sockets 55, 56 each with a front opening 57, 58. The tubular sockets 57, 58 are slightly larger than and able to receive the rear wheel struts 25, 27 when pivotally folded under the seat 25. The front openings 57, 58 at the edge of the seat allow the wheels to overhang the seat and fit into the adjacent area to the narrowing of the FIG. 8 shape, where in use the riders legs usually are located. The folded sheet shaped guards 53 54 ensure correct folding into the contiguous tubular sockets 55, 56. The guards also provide strength to the tricycle to support a rider.

The footprint therefore in the storage position is limited to just bigger than the footprint of the seat Also the volume is decreased to just larger than the volume of the seat.

To allow these three degrees of movement of the elongated continuous tubular post 31, the connection structure 41 is formed by two shaped shoulders 61, 62 partially surrounding the post 31. The shoulders sufficiently encompass the post 31 to allow rotation around its elongated axis. The shoulders are spaced at the front to provide a front opening allowing pivoting of the post 31 relative to the seat. The post 31 can further slide within the shoulders.

The structure can include locking pins to maintain the relevant spacing of the shoulders but allow the rotational movement to the storage position. Alternatively a collar system can be used with the collar allowing axial rotation of the post therein and sliding movement and the collar being pivotally mounted to the seat to allow rotational movement to the seat. Locking pins can be used to prevent rotation of the collar means until required. A spring means can be mounted on the upper section of the post and extending between the T-section and the seat to provide standard in use position until required.

In order to provide a stable base and to allow ready folding and minimisation of volume in a second storage position the angle of the front elongated continuous tubular post 31 is in the range of 20° to 30°. The seat is preferably 210 millimeters about the plane of the ground engaging wheels 26, 28 and 36 with the cross member 34 forming the steering mechanism is about 150 millimeters above the seat 25. The back wheel struts being angled in two directions can be about 25°.

Looking at one embodiment of the connection structure 41 as shown in FIGS. 11 to 16 there is shown a connection means 41 comprising a collar 71 fitting around a central portion of elongated continuous tubular post 31 to define an upper section 33 and lower section 32. The collar 71 has integral rearwardly extending parallel wings 72 with central corresponding pivot holes 73. A pivot pin (not shown) fits into the pivot holes 73 and an internal part of the top moulding 25a of the seat 25 that allows front elongated continuous tubular post 31 to pivot from an in use position splayed forwardly of the seat 25 to a second storage position alongside the underneath of the seat 25.

The system also includes a locking means in the form of a sliding latch system to selectively hold the steering mechanism of the front elongated continuous tubular post 31 and the cross member 34 forming the steering mechanism in a substantially upright in use position. The locking means includes a moulding 81 fitting within the two moulded parts of the seat 25a and 25b. The moulding 81 has rectangular U shaped fingers 82 with an arch shaped connecting body 83 symmetrically positioned at the top cross member of the U shaped fingers 82 and in the same plane. The fingers 82 extend on the outer side of the parallel wings 72 within the shoulders 61, 62 of the seat 25 and in the in use position engage pips 88 protruding from opposing sides of the front elongated continuous tubular post 31. The pips 88 protrude through slots 65 on the inner side of the shoulders 61, 62 opening to the front cut-out 24 in which the front elongated continuous tubular post 31 is mounted. The arch shaped connecting body 83 has a central opening 85 accessible through opening in moulded seat 25 to allow a finger to be inserted and the U shaped fingers 82 be withdrawn rearwardly away from the pips 88 to allow free rotation of the front elongated continuous tubular post 31 around pivot pin in pivot holes 73. A spring 86 mounted centrally at the outer top of the arch shaped connecting body 83 of the moulding 81 engages against other internal structure of the moulded seat 25 to provide a tendency force for the U shaped fingers 82 to return into the shoulders 61, 62 of the seat 25.

To allow the sliding system to further decrease the footprint of the tricycle in a second storage position the system further includes an external spring 44 mounted on the upper section 33 of the front elongated continuous tubular post 31 between the cross member 34 forming the steering mechanism and the collar 71. After release of the locking means 41 by retraction of the fingers 82 by manual pressure on the inside of the opening 85 in the connected arch shaped body 83, the front elongated continuous tubular post 31 is free to slide within the collar 71. The external spring 44 has a resistance which allows ready compression to an extent to allow the upper section 33 and the cross member 34 to be retracted partially to fit further under the seat 25 with the wheel 36 fitting in or adjacent the back cut-out 26.

Looking at a second embodiment of the connection structure 41 as shown in FIGS. 17 to 22 there is shown a connection means 41 which also comprises a collar 75 fitting around a central portion of elongated continuous tubular post 31 to define an upper section 33 and lower section 32. The collar 71 has integral rearwardly extending parallel wings 72 with central corresponding pivot holes 73. A pivot pin (not shown) fits into the pivot holes 73 and an internal part of the top moulding 25a of the seat 25 that allows front elongated continuous tubular post 31 to pivot from an in use position splayed forwardly of the seat 25 to a second storage position alongside the underneath of the seat 25.

The locking system is also substantially the same as the first embodiment. However a substantial difference is that instead of an external spring 44 mounted on the upper section 33 of the elongated continuous tubular post 31 there is an internal spring 49 within a slightly enlarged collar 75. This collar 75 is sized to encapsulate the spring. In a similar manner to the first embodiment it still allows a range of slide of upper section 33 through the collar 75 in opposition to the compressive resistance of the spring 49.

A further locking system can apply to retain the upper section 33 and cross member 34 in a retracted position against the force of the internal spring 49 or the external spring 44. However the fitting of the wheel 36 within the back cut-out 26 can provide sufficient opposition.

It should be understood that the above description is of a preferred embodiment as illustration only. It is not limiting of the invention. Clearly variations of the wheeled vehicle as would be understood by a person skilled in the art without any inventiveness are included within the scope of this invention as defined in the following claims.

The invention claimed is:

1. A wheeled vehicle comprising:
   a seat;
   a front wheel strut extending from a front portion of the seat and having one or more wheels attached;
   a steering mechanism associated with the front wheel strut and able to rotate the one or more wheels of the front wheel strut about a longitudinal axis of the front wheel strut; and
   a front strut connector mounting the front wheel strut to the seat to allow movement from a first operative position where the front wheel strut extends at an angle to the seat to a second storage position where the front wheel strut extends generally adjacent and at least partially underneath the seat;
   wherein the seat includes a cut out at the rear to receive the one or more wheels of the front wheel strut when the front wheel strut is in the second storage position.

2. A wheeled vehicle comprising:
   a seat;
   a front wheel strut extending from a front portion of the seat and having one or more wheels attached;

a steering mechanism associated with the front wheel strut and able to rotate the one or more wheels of the front wheel strut about a longitudinal axis of the front wheel strut;

a front strut connector mounting the front wheel strut to the seat to allow movement from a first operative position where the front wheel strut extends at an angle to the seat to a second storage position where the front wheel strut extends generally adjacent and at least partially underneath the seat;

at least one rear wheel strut with one or more wheels attached;

wherein the at least one rear wheel strut has a rear strut connector mounting the at least one rear wheel strut to the seat to allow movement from a first in use position where the at least one rear wheel strut extends away from the seat to a second folded position where the at least one rear wheel strut extends adjacent and at least partially underneath the seat;

wherein the seat includes a central narrow portion; and wherein, when the at least one rear wheel strut is in the second folded position, the one or more wheels of the at least one rear wheel strut are disposed either side of the central narrow portion.

3. The wheeled vehicle according to claim 2, wherein the seat includes a cut out at the rear to receive the one or more wheels of the front wheel strut when the front wheel strut is in the second storage position.

4. A tricycle comprising:

a seat;

two rear wheel struts connected to and extending from an underneath rear portion of the seat, each rear wheel strut having one or more wheels attached; and an elongate post mounted at a front portion of the seat, the elongate post including:

a first section extending below the seat, the first section of the elongate post forming at least part of a front wheel strut having one or more wheels attached; and a second section extending above the seat, the second section of the elongate post forming at least part of a steering mechanism that is able to rotate the front wheel strut and the one or more wheels of the front wheel strut about a longitudinal axis of the front wheel strut;

wherein the elongate post is mounted to the seat by a first connector that allows the elongate post to move from a first in use position where the front wheel strut substantially extends away from the seat to a second storage position where the front wheel strut substantially extends adjacent and at least partially underneath the seat;

wherein the rear wheel struts are mounted to the seat by connectors that allow the rear wheel struts to move from a first in use position where the rear wheel struts substantially extend away from the seat to a second storage position where the rear wheel struts substantially extend adjacent and at least partially underneath the seat;

wherein the first connector includes a collar pivotally connected to the seat; and wherein the collar captures the elongate post enabling the steering mechanism to rotate the elongate post about a longitudinal axis of the elongate post.

5. The tricycle according to claim 4, wherein the first connector provides pivotal mounting of the elongate post to the seat; and wherein the rear wheel struts each have a pivotal mounting that allows the rear wheel struts to pivot in an opposite direction to the front wheel strut.

6. The tricycle according to claim 4, wherein the steering mechanism includes a handle; and wherein the elongate post is captured in the collar to allow the elongate post to longitudinally slide at least partially through the collar to reduce the protrusion of the handle beyond the seat when the elongate post is in the second storage position.

7. The tricycle according to claim 6, wherein the elongate post is maintained in the in use position by a lock that allows rotation of the elongate post about the longitudinal axis of the elongate post when the elongate post is in the in use position.

8. The tricycle according to claim 6, further comprising a spring means engaging the collar and the elongate post for urging the second section of the elongate post above the collar.

9. The tricycle according to claim 7, wherein the lock includes an engagement body for engaging between the seat and the collar or elongate post to prevent pivotal rotation of the elongate post from the in use position to the second storage position.

10. The tricycle according to claim 9, wherein the collar includes one or more protrusions and the engagement body of the lock includes a latch mechanism slidable within the seat between an engagement position for engaging the one or more protrusions of the collar for maintaining the elongate post in the in use position, and a disengagement position for disengaging the one or more protrusions and allowing pivotal rotation of the elongate post to the second storage position.

11. The tricycle according to claim 8, wherein the elongate post further includes a protruding collar for engaging the collar of the first connector for limiting the upward longitudinal movement of the elongate post relative to the collar of the first connector when the elongate post is in the in use position.

12. The wheeled vehicle according to claim 1, further comprising:

at least one rear wheel strut with one or more wheels attached;

wherein the at least one rear wheel strut has a rear strut connector mounting the at least one rear wheel strut to the seat to allow movement from a first in use position where the at least one rear wheel strut extends away from the seat to a second folded position where the at least one rear wheel strut extends adjacent and at least partially underneath the seat.

13. The wheeled vehicle according to claim 12, wherein the seat includes a central narrow portion; and wherein, when the at least one rear wheel strut is in the second folded position, the one or more wheels of the at least one rear wheel strut are disposed either side of the central narrow portion.

14. The wheeled vehicle according to claim 1, further comprising an elongate rod including:

a first portion extending below the seat, the first portion of the elongate rod forming at least part of the front wheel strut; and a second portion extending above the seat, the second portion of the elongate rod forming at least part of the steering mechanism;

wherein the front strut connector includes a collar capturing the elongate rod; and wherein the steering mechanism includes a handle at a top end of the elongate rod, the collar enabling rotation of the elongate rod about the elongate rod's longitudinal axis by turning of the handle to allow steering of the wheeled vehicle when the front wheel strut is in the first operative position.

15. The wheeled vehicle according to claim 14, wherein the elongate rod is captured in the collar to allow the elongate rod to longitudinally slide at least partially through the collar to reduce the protrusion of the handle beyond the seat when the front wheel strut is in the second storage position.

16. The wheeled vehicle according to claim 15, further comprising a spring means engaging the collar and the elongate rod for urging the second portion of the elongate rod above the collar.

17. A wheeled vehicle comprising:
a seat;
a front wheel strut extending from a front portion of the seat and having one or more wheels attached;
a steering mechanism associated with the front wheel strut and able to rotate the one or more wheels of the front wheel strut about a longitudinal axis of the front wheel strut;
a front strut connector pivotally mounting the front wheel strut to the seat to allow movement from a first operative position where the front wheel strut extends at an angle to the seat to a second storage position where the front wheel strut extends generally adjacent and at least partially underneath the seat; and
at least one rear wheel strut with one or more wheels attached;
wherein the at least one rear wheel strut has a rear strut connector pivotally mounting the at least one rear wheel strut to the seat to allow movement from a first operative position where the at least one rear wheel strut extends away from the seat to a second folded position where the at least one rear wheel strut extends adjacent and at least partially underneath the seat;
wherein the at least one rear wheel strut pivots in an opposite direction to the front wheel strut.

18. The wheeled vehicle according to claim 17, further comprising an elongate rod including:
a first portion extending below the seat, the first portion of the elongate rod forming at least part of the front wheel strut; and
a second portion extending above the seat, the second portion of the elongate rod forming at least part of the steering mechanism;
wherein the front strut connector includes a collar capturing the elongate rod; and
wherein the steering mechanism includes a handle at a top end of the elongate rod, the collar enabling rotation of the elongate rod about the elongate rod's longitudinal axis by turning of the handle to allow steering of the wheeled vehicle when the front wheel strut is in the first operative position.

19. A wheeled vehicle as claimed in claim 17, wherein the seat includes a cut out at the rear to receive the one or more wheels of the front wheel strut when the front wheel strut is in the second storage position.

20. A wheeled vehicle as claimed in claim 17, wherein the seat includes a central narrow portion; and
wherein, when the at least one rear wheel strut is in the second folded position, the one or more wheels of the at least one rear wheel strut are disposed either side of the central narrow portion.

21. The wheeled vehicle according to claim 18, wherein the elongate rod is captured in the collar to allow the elongate rod to longitudinally slide at least partially through the collar to reduce the protrusion of the handle beyond the seat when the front wheel strut is in the second storage position.

22. The wheeled vehicle according to claim 21, wherein the collar of the front strut connector is pivotally mounted to the seat.

23. The wheeled vehicle according to claim 22, further comprising a lock disposed on the seat for engaging the collar or the elongate rod for preventing pivotal rotation of the front wheel strut to the second storage position while allowing axial rotation of the elongate rod for steering of the wheeled vehicle.

24. The wheeled vehicle according to claim 21, including a spring means engaging the collar and the elongate rod for urging the second portion of the elongate rod above the collar.

25. The wheeled vehicle according to claim 23, wherein the collar includes one or more protrusions; and
wherein the lock includes a latch mechanism slidable within the seat between an engagement position for engaging the one or more protrusions of the collar for maintaining the front wheel strut in the first operative position and a disengagement position for disengaging the protrusions and allowing pivotal rotation of the front wheel strut to the second storage position.

26. The wheeled vehicle according to claim 24, wherein the elongate rod further includes a collar for engaging the collar of the front strut connector for limiting the upward longitudinal movement of the elongate rod relative to the collar of the front strut connector when the front wheel strut is in the first operative position.

27. The wheeled vehicle according to claim 24, wherein the front strut connector mounts the front wheel strut directly to the seat.

28. The wheeled vehicle according to claim 24, wherein the front strut connector mounts the front wheel strut in a manner that allows the front wheel strut to pivot between the first and second positions along a generally upright plane that is aligned with a longitudinal axis of the wheeled vehicle that extends between a front and rear of the wheeled vehicle.

29. The tricycle according to claim 4, wherein the elongate post is mounted directly to the seat by the first connector.

30. The tricycle according to claim 4, wherein the elongate post is mounted to the seat by the first connector in a manner that allows the elongate post to pivot between the first and second positions along a generally upright plane that is aligned with a longitudinal axis of the tricycle that extends between a front and rear of the tricycle.

* * * * *